United States Patent [19]
Ohashi

[11] Patent Number: 4,884,780
[45] Date of Patent: Dec. 5, 1989

[54] VALVE ACTUATING ARRANGEMENT

[75] Inventor: Toshio Ohashi, Atsugi, Japan

[73] Assignee: Nissan Motor Company, Limited, Japan

[21] Appl. No.: 727,800

[22] Filed: Apr. 26, 1985

[51] Int. Cl.$^4$ .................... F16K 31/00; F16K 31/18
[52] U.S. Cl. .................................. 251/11; 60/527;
60/528; 60/529; 219/504; 219/505; 219/511;
337/140; 237/123 B; 165/42
[58] Field of Search .......... 60/527, 528, 529;
251/11; 219/504, 505, 511; 357/140; 165/40,
42; 237/12.3 B

[56] References Cited

U.S. PATENT DOCUMENTS

| | | | |
|---|---|---|---|
| 2,960,303 | 11/1960 | Smallpeice | 60/528 |
| 3,500,634 | 3/1970 | Waseleski, Jr. | 251/11 |
| 3,540,479 | 11/1970 | Thompson | 251/11 |
| 3,826,924 | 7/1974 | Plough et al. | 219/505 |
| 3,912,219 | 10/1975 | Weinstein | 251/11 |
| 3,968,380 | 7/1976 | Jost et al. | 337/140 |
| 4,027,848 | 6/1977 | Mundil | 251/11 |
| 4,174,511 | 11/1979 | Knapp et al. | 219/511 |
| 4,189,093 | 2/1980 | Schnaibel et al. | 165/40 |
| 4,284,235 | 8/1981 | Diermayer et al. | 251/11 |
| 4,522,219 | 6/1985 | Ohkata | 251/11 |
| 4,524,343 | 6/1985 | Morgan et al. | 337/140 |
| 4,559,512 | 12/1985 | Yaeger et al. | 60/527 |

FOREIGN PATENT DOCUMENTS

| | | | |
|---|---|---|---|
| 0153216 | 9/1984 | Japan | 251/11 |
| 2047487 | 11/1980 | United Kingdom | 219/505 |
| 2125938 | 3/1984 | United Kingdom | 251/11 |

Primary Examiner—John K. Ford
Attorney, Agent, or Firm—Leydig, Voit & Mayer

[57] ABSTRACT

An active member can deform in accordance with its temperature. The active member is connected to a mechanically-operated valve member so that the operated member is driven in accordance with deformation of the active member. The temperature of the active member is adjusted to control the operated member.

9 Claims, 4 Drawing Sheets

4,884,780

VALVE ACTUATING ARRANGEMENT

BACKGROUND OF THE INVENTION

1. Field of the Invention

This invention relates to an arrangement for actuating a mechanically-operated member or device, such as a valve or a door in an automotive air conditioner.

2. Description of the Prior Art

Automotive air conditioners have valves or doors for adjusting the fluid flow rates at various points in the system. Arrangements for actuating these valves or doors generally include a vacuum source, an electrically-driven solenoid valve, and a vacuumresponsive actuator. The solenoid valve selectively supplies vacuum from the source to the vacuum actuator or disconnects the vacuum source from the vacuum actuator. The vacuum actuator is mechanically connected to the valve or door to be actuated. These actuating arrangements have a considerable number of parts and are rather bulky.

SUMMARY OF THE INVENTION

It is an object of this invention to provide an actuating arrangement having fewer parts.

Another object of this invention is to provide a compact actuating arrangement.

Accordingly, the present invention provides an arrangement for controlling fluid flow comprising a mechanically operated device having a mechanism for controlling fluid flow passing through the device, a device actuating member, an electric current supply, and a thermistor. The device actuating member includes an apparatus made from a shape memory material for actuating the device to open and close repeatedly according to deformations of the shape memory material due to its temperature rise and drop above and below a critical point. The thermistor has a positive temperature coefficient, is interposed between the electric current supply and the actuating apparatus, and is thermally coupled to the actuating apparatus in such a manner as to repeatedly open and close the controlling mechanism when current flows through the thermistor.

The present invention further provides an arrangement comprising a mechanically operated device having a mechanism for controlling fluid flow, a casing, a device actuating member, an electric current supply, and a resistance arrangement. The device actuating member includes a metal member having a helical portion made of a shape memory material. The helical portion, which is disposed within the casing, is deformable in accordance with a change in the temperature of the helical portion about a critical temperature. The resistance arrangement serves to repeatedly increase and decrease current from the electric current supply to repeatedly increase and decrease the temperature of the helical portion about the critical temperature. The resistance arrangement includes a thermistor having a positive temperature coefficient. The thermistor is connected to the electric current supply and is thermally coupled to the helical portion in such a manner to repeatedly open and close the controlling mechanism when current flows through the thermistor.

BRIEF DESCRIPTION OF THE DRAWINGS

Corresponding and like elements are denoted by the same reference characters throughout the drawings.

DESCRIPTION OF THE PREFERRED EMBODIMENTS

Figure 1:
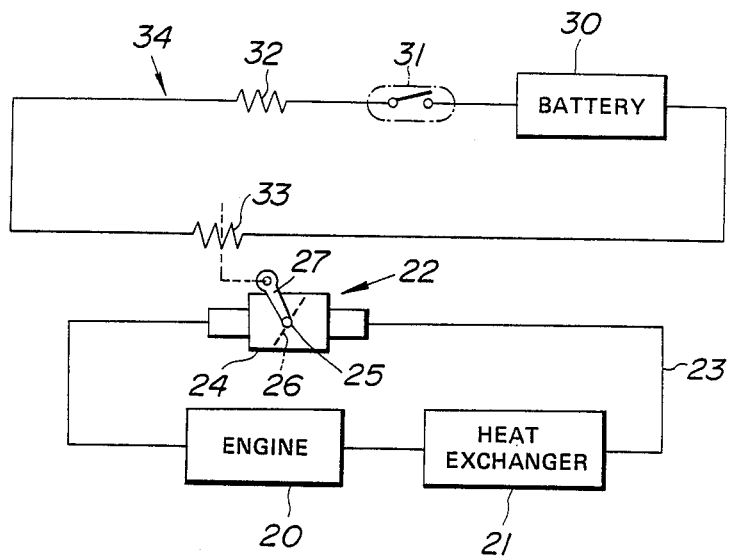
FIG. 1 is a diagram of part of an automotive air conditioner according to a first embodiment of this invention.

With reference to FIG. 1 illustrating a first embodiment of this invention, an automotive engine 20, a heat exchanger 21 of an automotive air conditioner, and a mechanically-operated valve or water cock 22 are connected in series by a coolant conduit 23 to form a loop of coolant flow circuit.

The water cock 22 selectively blocks and unblocks the coolant conduit 23. When the water cock 22 unblocks the coolant conduit 23, coolant flows out of the engine 20 and passes through the heat exchanger 21 before re-entering the engine 20. When the water cock 22 blocks the coolant conduit 23, the flow of coolant through the heat exchanger 21 is interrupted. Accordingly, operation of the heat exchanger 21 is controlled via the water cock 22.

Figure 2:
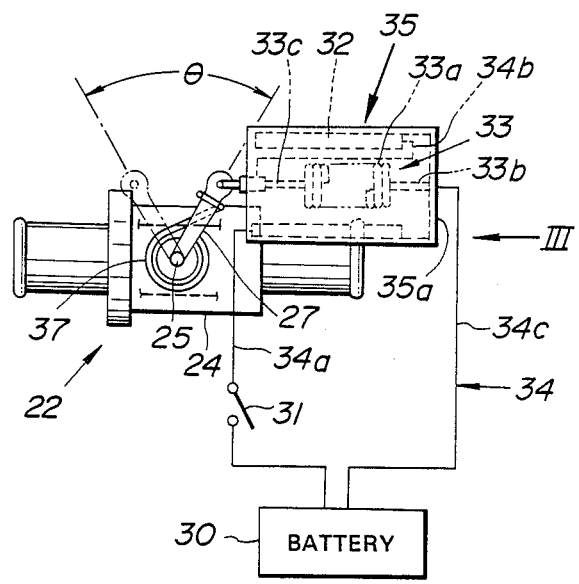
FIG. 2 is a side view, partly diagrammatic, of the water cock and the mechanism actuating the water cock of FIG. 1.
Figure 3:
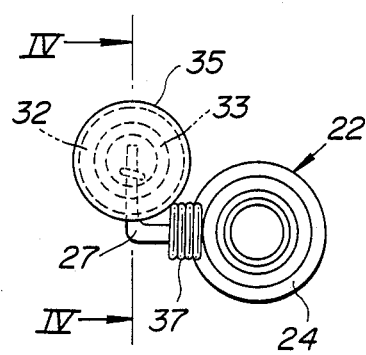
FIG. 3 is a view along the arrow III in FIG. 2.

As shown in FIGS. 1, 2, and 3, the water cock 22 includes a casing 24, a shaft 25 rotatably supported by and extending through the casing 24, and a valve member 26 disposed within the casing 24 and mounted on the shaft 25. The casing 24 defines part of the coolant flow path. The valve member 26 is rotatable between a closed position and an open position. When the valve member 26 is in its closed position, the path of coolant flow is blocked. When the valve member 26 is in its open position, the path of coolant flow is unblocked. An arm or lever 27 located outside the casing 24 is mounted on one end of the shaft 25. As the lever 27 pivots, the shaft 25 and the valve member 26 pivot together.

Figure 4:
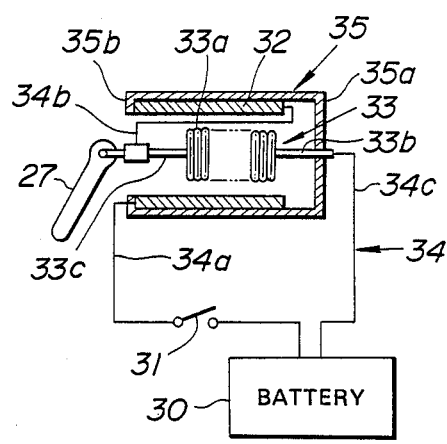
FIG. 4 is a sectional view taken along the line IV—IV of FIG. 3.

As shown in FIGS. 1, 2, and 4, an electrical power source or storage battery 30, a switch 31, a temperature-responsive resistor 32, and an active member 33 are electrically connected in series by a line 34 to form a loop of electrical circuit. When the switch 31 is closed, electrical current flows through the circuit due to the voltage across the power source 30. When the switch 31 is opened, the flow of electrical current through the circuit is interrupted.

As shown in FIGS. 2 to 4, the temperature-responsive resistor 32 is an annulus or a cylindrical shell coaxially disposed within a cylindrical casing 35. The resistor 32 is supported by the casing 35. In cases where the casing 35 is made of electrically-conductive material, such as metal, an insulating member or material is interposed between the resistor 32 and the casing 35. One terminal or end of the resistor 32 is electrically connected to the $ positive terminal of the electrical power source 30 via leads 34a forming part of the line 34. It should be noted that the switch 31 is disposed in the electrical connection between the resistor 32 and the power source 30.

Figure 5:
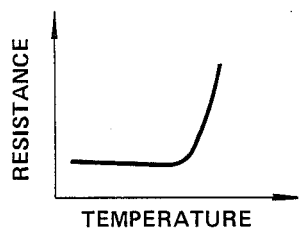
FIG. 5 is a graph of the relationship between the resistance and the temperature of the temperature-responsive resistor of FIGS. 1 to 4.
Figure 6:
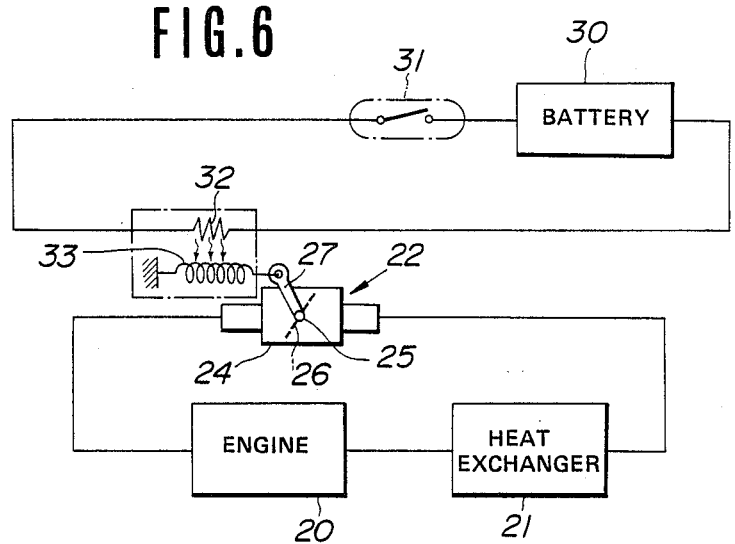
FIG. 6 is a diagram of part of an automotive air conditioner according to a second embodiment of this invention.
Figure 7:
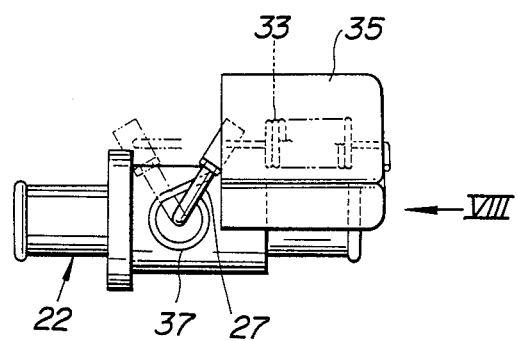
FIG. 7 is a side view of the water cock and the mechanism actuating the water cock of FIG. 6.
Figure 8:
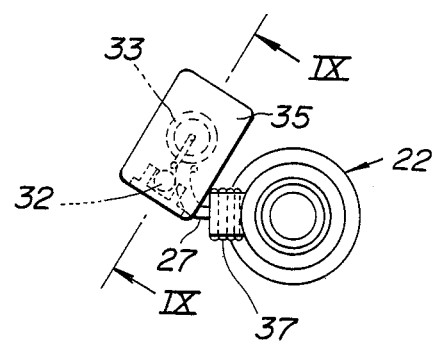
FIG. 8 is a view along the arrow VIII in FIG. 7.
Figure 9:
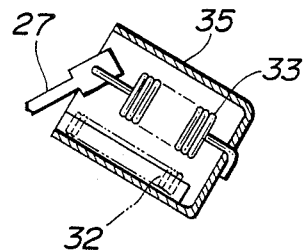
FIG. 9 is a sectional view taken along the line IX—IX of FIG. 8.

As shown in FIG. 5, the resistance of the resistor 32 remains essentially constant at temperatures below a fixed point. At temperatures above the fixed point, the resistance of the resistor 32 increases quickly with temperature. The resistor 32 is preferably a thermistor having positive temperature coefficient (PTC) properties.

As best shown in FIGS. 2 and 4, the active member 33 includes a helical portion 33a and straight portions 33b and 33c integral with the helical portion 33a. The helical portion 33a is coaxially disposed within the cylindrical resistor 32. The first straight portion 33b extending axially from one end of the helical portion 33a passes through the center of a circular end wall 35a of the casing 35. The first straight portion 33b is fixedly supported by the end wall 35a. In cases where the end wall 35a is made of an electrically-conductive material, such as metal, an insulating member or material is interposed between the straight portion 33b and the end wall 35a. The first straight portion 33b is electrically connected to the negative terminal of the electrical power source 30 via leads 34c forming part of the line 34. The second straight portion 33c extending axially from the other end of the helical portion 33a passes through an opening in the opposite end wall 35b of the casing 35 and engages the free end of the lever 27. The second straight portion 33c is electrically connected to the other terminal or end of the cylindrical resistor 32 via leads 34b forming part of the line 34.

The active member 33 is made of an alloy $ exhibiting shape-memory properties or effect. The active member 33 is designed to be deformable between a "memorized" expanded position and a contracted position in accordance with its temperature. Specifically, the helical portion 33a sensitively expands and contracts in accordance with its temperature. At temperatures above a critical point, the active member 33 remains in its expanded position. As the temperature drops below the critical point, the active member 33 deforms out of its expanded position toward its contracted position. At temperatures below the critical point, the active member 33 is held in its contracted position. When the temperature rises above the critical point, the active member 33 returns to its expanded position. Deformation of the active member 33 can be repeated indefinitely.

It should be noted that cyclic deformation of the active member 33 involves thermal hysteresis. Specifically, there is a difference between a first critical temperature at which the active member 33 deforms into the expanded position and a second critical temperature at which the active member 33 deforms out of the expanded position. This thermal hysteresis is not essential to this invention and the difference between the critical temperatures has essentially no effect on the operation of this invention. Accordingly, thermal hysteresis will not be considered further in the description of this invention to facilitate understanding of the invention itself.

When the active member 33 is in its contracted position, the valve member 26 of the water cock 22 is in its closed position. As the active member 33 deforms into its expanded position, the active member 33 pivots the lever 27 through an angle $\theta$ against the force of a return spring 37, thereby moving the valve member 26 to its open position. It should be noted that the return spring 37 is seated between the lever 27 and the casing 24 to urge the lever 27 in the angular direction of forcing the active member 33 toward its contracted position. As the active member 33 returns to its contracted position with the aid of the return spring 37, the lever 27 pivots in accordance with movement of the active member 33, rotating the valve member 26 into its closed position.

In operation, while the switch 31 remains open, no current flows through the resistor 32 and the active member 33. In these cases, the temperature of the active member 33 remains below the critical point so that the active member 33 remains in its contracted position. As long as the active member 33 is in its contracted position, the water cock 22 continuously blocks the coolant conduit 23 and thus interrupts the supply of coolant to the heat exchanger 21 of the air conditioner. This continuous interruption of coolant supply holds the heat exchanger 21 at rest.

When the switch 31 is closed, current flows through the resistor 32 and the active member 33. Since the active member 33 has a resistance, the current causes the active member 33 to heat up. As a result, the temperature of the active member 33 rises above the critical point so that the active member 33 deforms into its expanded position. When the active member 33 assumes its expanded position, the valve member 26 of the water cock 22 moves into its open position, unblocking the coolant conduit 23 and supplying coolant to the heat exchanger 21 of the air conditioner. This supply of coolant activates the heat exchanger 21.

Since the resistor 32 has a resistance, the current also causes the resistor 32 to heat up. As shown in FIG. 5, when the temperature of the resistor 32 rises above the fixed point, the resistance of the resistor 32 starts to increase abruptly. This increase in the resistance reduces the current, thereby decreasing the temperature of both the resistor 32 and the active member 33. As a result, the temperature of the active member 33 drops below the critical point so that the active member 33 returns to its contracted position. When the active member 33 assumes its o contracted position, the valve member 26 of the water cock 22 moves to its closed position, blocking the coolant conduit 23 and interrupting the supply of coolant to the heat exchanger 21 of the air conditioner As shown in FIG. 5, as the temperature of the resistor 32 decreases, its resistance also drops. This drop in the resistance increases the current, thereby increasing the temperature of both the resistor 32 and the active member 33. As a result, the temperature of the active member 33 again rises above the critical point so that the valve member 26 of the water cock 22 moves into its open position whereby coolant is supplied to the heat exchanger 21 of the air conditioner.

These actions cyclically iterate as long as the switch 31 remains closed. Accordingly, the valve member 26 of the water cock 22 reciprocates between its open and closed positions at a fixed frequency while the switch 31 is closed. In this case, coolant is periodically supplied to the heat exchanger 21 of the air conditioner; in other words, the heat exchanger 21 is activated periodically.

The current is limited to within an approximate range by the temperature-resistance characteristics of the resistor 32. These characteristics of the resistor 32 are preferably chosen so as to prevent excessive current through the active member 33 as well as undue consumption of electrical energy. Due to the electrical properties of the resistor 32, the temperatures of the resistor 32 and the active member 33 are limited to within respective approximate ranges while the switch 31 is closed. This has obvious advantages in fire prevention and in preventing undue wear on the active member 33.

When the switch 31 is opened, the current flow through the resistor 32 and the active member 33 is interrupted. This allows the active member 33 to cool down. As a result, the temperature of the active member 33 drops and then remains below the critical point so that the active member 33 returns to and then remains in its contracted position. Thus, the valve member 26 of the water cock 22 returns to and then remains in its closed position. Accordingly, the water cock 22 continuously blocks the coolant conduit 23, holding the heat exchanger 21 of the air conditioner inactive.

The active member 33 may also be designed to remain in its expanded position while the switch 31 is closed. This is achieved by changing the temperature-resistance characteristics of the resistor 32.

FIGS. 6 to 9 show a second embodiment of this invention. This embodiment is similar to the embodiment of FIGS. 1 to 5 except for the following design changes.

The electrical power source 30, the switch 31, and the temperature-responsive resistor 32 are electrically connected in series to form a loop of electrical circuit. The active member 33 is electrically isolated from this loop.

When the switch 31 is closed, current flows through the resistor 32 due to the voltage across the power source 30. The current flow through the resistor 32 causes the resistor 32 to heat up. Thus, the resistor 32 can serve as a heat or thermal source. The temperature-resistance characteristics of the resistor 32 limits the current through the resistor 32 as in the embodiment of FIGS. 1 to 5.

When the switch 31 is opened, the supply of current to the resistor 32 is interrupted. This allows the resistor 32 to cool down.

The active member 33 and the resistor 32 are housed in the common casing 35 so that the active member 33 can be heated by the resistor 32. In this case, it is obviously best to dispose the resistor 32 near the active member 33. The resistor 32 is in the form of a solid cylinder and extends parallel to the active member 33.

When the resistor 32 heats the active member 33, the active member 33 deforms into its expanded position. When the resistor 32 cools down and thus suspends heating of the active member 33, the active member 33 deforms into its contracted position.

Figure 10:
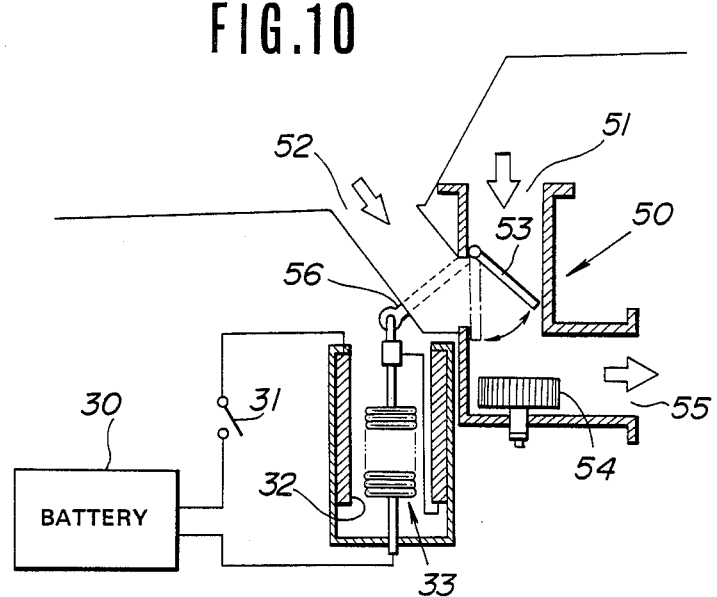
FIG. 10 is a diagram of part of an automotive air conditioner according to a third embodiment of this invention.

FIG. 10 shows a third embodiment of this invention. This embodiment is similar to the embodiment of FIGS. 1 to 5, except for the following design changes.

An automotive air conditioner includes an upstream duct 50 having an interior inlet 51 and an exterior inlet 52. The first inlet 51 opens into the passenger compartment of the automotive vehicle. The second inlet 52 opens outside of the automotive vehicle. An intake door 53 disposed within the duct 50 can pivot between first and second positions. When the intake door 53 is in its first position, it blocks the interior inlet 51 and unblocks the exterior inlet 52. When the intake door 53 is in its second position, it unblocks the interior inlet 51 and blocks the exterior inlet 52.

A blower 54 disposed within the duct 50 downstream of the intake door 53 draws in air via the inlets 51 and 52. The duct 50 has an outlet 55 leading to a cooling unit (not shown) and a heating unit (not shown). The blower 54 drives the air into the cooling and heating units via the outlet 55.

When the intake door 53 blocks the interior inlet 51 and unblocks the exterior inlet 52, fresh air is admitted from outside into the automotive vehicle via the duct 50. When the intake door 53 unblocks the interior inlet 51 and blocks the exterior inlet 52, air from the interior of the vehicle is drawn into the duct 50 and is then recirculated into the passenger compartment of the vehicle via the cooling and heating units.

One end of the active member 33 engages a free end of a lever 56 mounted on a pivot of the intake door 53. As the active member 33 deforms between its contracted and expanded positions, the intake door 53 moves between its first and second positions.

Figure 11:
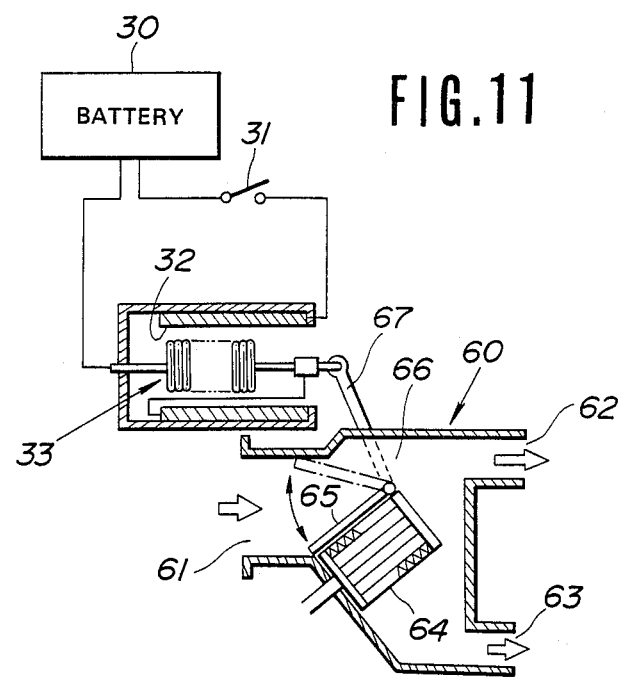
FIG. 11 is a diagram of part of an automotive air conditioner according to a fourth embodiment of this invention.

FIG. 11 shows a fourth embodiment of this invention. This embodiment is similar to the embodiment of FIGS. 1 to 5, except for the following design changes.

An automotive air conditioner includes a downstream duct 60 having an inlet 61 and outlets 62 and 63. A heater core or heat exchanger 64 is disposed within the duct 60. An air mix door 65 disposed within the duct 60 can pivot between first and second positions. When the air mix door 65 is in its first position, it blocks the front face or inlet of the heat exchanger 64 and unblocks a passage 66 bypassing the heat exchanger 64. In this case, essentially all of air admitted via the inlet 61 into the duct 60 bypasses the heat exchanger 64 and then exits from the duct 60 via the outlets 62 and 63 so that the heat exchanger 64 does not affect the temperature of air. When the air mix door 65 is in its second position, it unblocks the front face or inlet of the heat exchanger 64 and blocks the bypass passage 66. In this case, essentially all of the air flows through the heat exchanger 64 so that the heat exchanger 64 has a maximal effect on the temperature of output air. The air mix door 65 thus adjustably determines the rates of air passing through and bypassing the heat exchanger 64.

One end of the active member 33 engages a free end of a lever 67 mounted on a pivot of the air mix door 65. As the active member 33 deforms between its contracted and expanded positions, the air mix door 65 moves between its first and second positions.

What is claimed is:

1. An arrangement for controlling fluid flow comprising:
   a mechanically operated device having means for controlling fluid flow passing through the device;
   (b) a device actuating member including means made from a shape memory material for actuating the device to open and close repeatedly according to deformations of the shape memory material due to its temperature rise and drop above and below a critical point;
   (c) an electric current supply; and (d) a thermistor having a positive temperature coefficient, interposed between the electric current supply and the actuating means, and thermally coupled to the actuating means in such a manner to repeatedly open and close the controlling means when current flows through the thermistor.

2. The arrangement of claim 1 wherein the actuating means serves as an expansion spring which actuates the controlling means to open when the actuating means receives electric current from the electric current supply via the thermistor, heats up and deforms to an expanded position and serves as an contraction spring which actuates the controlling means to close when the temperature of the thermistor increases and the actuating means deforms to a contracted position.

3. The arrangement of claim 2 wherein the actuating member further comprises the spring which biases the controlling means to the closed position.

4. An arrangement comprising:
   (a) a mechanically operated device having means for controlling fluid flow;
   (b) a casing;
   (c) a device actuating member including a metal member having a helical portion made from a shape memory material, the helical portion being deformable in accordance with a change in the temperature of the helical portion about a critical temperature and being disposed within the casing;
   (d) an electric current supply; and
   (e) resistance means for repeatedly increasing and decreasing the current from the electric current supply to repeatedly increase and decrease the temperature of the helical portion about the critical temperature, the resistance means including a thermistor having a positive temperature coefficient, the thermistor being connected to the electric current supply and thermally coupled to the helical portion in such a manner to repeatedly open and close the controlling means when current flows through the thermistor.

5. The arrangement of claim 4 wherein the metal member is connected to the electric current supply.

6. The arrangement of claim 5 wherein the metal member and the thermistor are connected in series to the electric current supply.

7. The arrangement of claim 4 wherein the thermistor comprises a cylindrical shell and wherein the helical portion of the metal member is disposed coaxially within the cylindrical shell of the thermistor.

8. The arrangement of claim 4 further comprising switch means for selectively enabling and interrupting the supply of electrical energy to the thermistor.

9. The arrangement of claim 4 wherein the tjermistor is thermally coupled to the metal member to cyclically increase and decrease the temperature of the metal member aboutthe critical point.

* * * * *